United States Patent
Strähle

[19]

[11] Patent Number: 6,039,110
[45] Date of Patent: Mar. 21, 2000

[54] HEAT STORE, ESPECIALLY LATENT HEAT STORE

[75] Inventor: Roland Strähle, Unterensingen, Germany

[73] Assignee: Laengerer & Reich GmbH & Co., Filderstadt, Germany

[21] Appl. No.: 08/586,894

[22] PCT Filed: Apr. 19, 1994

[86] PCT No.: PCT/DE94/00441

§ 371 Date: Jan. 22, 1996

§ 102(e) Date: Jan. 22, 1996

[87] PCT Pub. No.: WO95/03519

PCT Pub. Date: Feb. 2, 1995

[30] Foreign Application Priority Data

Jul. 20, 1993 [DE] Germany .................... 43 24 252

[51] Int. Cl.[7] .................................................. F28D 17/00
[52] U.S. Cl. ................ 165/10; 29/890.06; 285/158; 285/417
[58] Field of Search ................ 165/10; 285/158, 285/417; 29/890.06

[56] References Cited

U.S. PATENT DOCUMENTS

| | | | |
|---|---|---|---|
| 2,447,259 | 8/1948 | Lucke | 285/158 |
| 2,966,340 | 12/1960 | Chapman | 285/158 |
| 3,344,506 | 10/1967 | Bottum et al. | 29/890.06 |
| 4,073,514 | 2/1978 | Pate | 285/158 X |
| 5,090,474 | 2/1992 | Schatz | 165/10 |
| 5,222,298 | 6/1993 | Schatz | 165/10 X |
| 5,449,035 | 9/1995 | Strähle et al. | 165/10 |

FOREIGN PATENT DOCUMENTS

| | | | |
|---|---|---|---|
| 3614318 | 10/1987 | Germany | 165/10 |
| 0160169 | 7/1991 | Japan | 29/890.06 |
| 4124592 | 4/1992 | Japan | 165/10 |

OTHER PUBLICATIONS

Flinn et al., Engineering Materials and their applications, 1975, pp. 158–161.

*Primary Examiner*—Christopher Atkinson
*Attorney, Agent, or Firm*—Michael J. Striker

[57] ABSTRACT

A heat accumulator comprises an interior envelope containing an accumulator core, an exterior envelope surrounding the interior envelope at a distance therefrom so as to form an insulating chamber, two lines extending through the insulating chamber and including an inflow line and an outflow line for a heat conveying medium, each of the lines having a line section extending in the insulating chamber, the line sections being formed of a metal having low heat conducting capability.

22 Claims, 1 Drawing Sheet

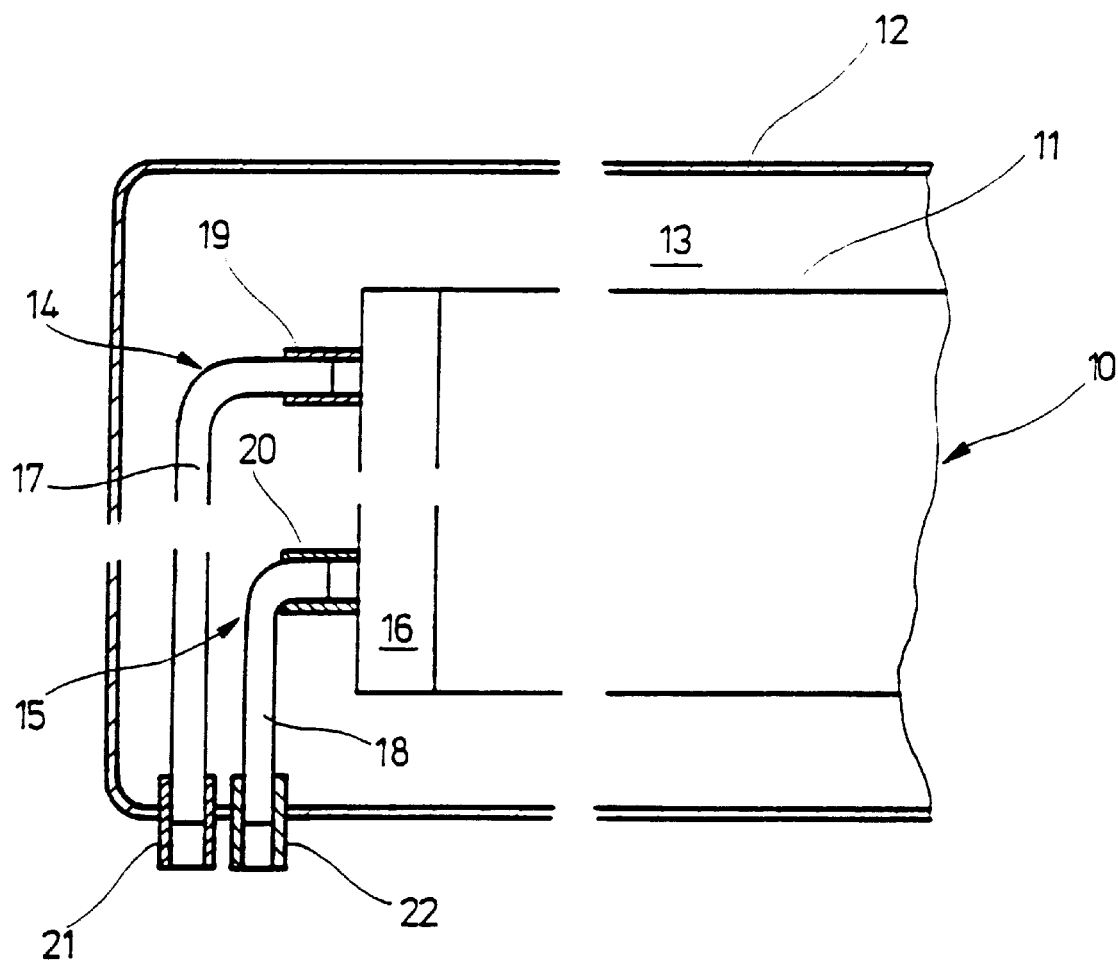

HEAT STORE, ESPECIALLY LATENT HEAT STORE

BACKGROUND OF THE INVENTION

The present invention relates to a heat accumulator, in particular a latent heat accumulator. More particularly, it relates to a heat accumulator which has an interior envelope with an accumulator core and an exterior envelope surrounding the interior envelope at a distance to form an insulating chamber, with lines passing through the insulating chamber.

In a known heat accumulator of this type (DE-OS 40 07 004), the line sections led through the insulation chamber are made of plastic, because its heat conducting capability is less than that of metal lines. For comparison, continuous, one-piece aluminum pipes, for example, can be cited as metal lines. The design of the line section in plastic has many disadvantages. For one, no permanent temperature stability is assured, particularly if the heat-conveying medium is at high temperature during operation. It is furthermore disadvantageous that line sections made of plastic cannot be fastened sealingly, preferably vacuum-sealed, at all or only with great effort and doubtful results on the interior envelope and at the place where these line sections pass through the exterior envelope, fastened on the outer envelope. With vacuum-insulated heat accumulators, the material of the line sections must be sealed against diffusion, i.e. suitable for a vacuum. Plastic cannot lastingly meet such requirements. In addition, plastic can also not withstand the prevailing mechanical stresses, for example oscillation stresses, in the long run.

SUMMARY OF THE INVENTION

Accordingly, it is an object of the present invention to provide a heat accumulator, in particular a latent heat accumulator, which avoids the disadvantages of the prior art.

More particularly, it is an object of the present invention to provide a heat accumulator, in particular a latent heat accumulator, wherein the heat losses caused by the inflow and outflow lines can be reduced in as simple as possible a way, as well as the manufacture of the heat accumulator as cost-effectively as possible.

In keeping with these objects and with others which will become apparent hereinafter, one feature of the present invention resides, briefly stated, in a heat accumulator of the above mentioned general type in which in the lines passing through the insulating chamber and having a line section extending in the insulating chamber and made of a material with reduced heat-conductive capability the respective line section is constituted of a metal having a low heat conducting capability. It is possible in this way to reduce the heat losses in the area of the line sections because of low heat-conducting capability, wherein the metallic material itself is vacuum-tight and at the same time makes possible a welded or soldered connection in a simple way, and thus a cost-effective manufacture of the heat accumulator. It is furthermore advantageous that the respective metallic line sections can also lastingly withstand high temperatures of the heat-conveying medium and great mechanical stresses and make lasting vacuum-tight connections possible.

In accordance with a further features of the present invention, the metal with reduced heat conducting capability can be welded or soldered, and it can be a special steel, for example a rust and acid resistance chromium nickel alloy steel. The respective line area can be provided with a connecting sleeve in the area adjoining the interior envelope or exterior envelope to fasten on the corresponding envelope. The connecting sleeve can be made of aluminum. The envelopes can be also made of aluminum. Particularly in those cases, where the components of the heat accumulator consist of aluminum and the connection sleeves present in each end area of each line section also consist of aluminum, an aluminum/aluminum weld connection or solder connection of the lines is possible in a simple manner, in particular of their connection sleeves at the ends, and of the interior envelope, for example a collecting reservoir, as well as of the outer envelope. A considerable reduction of heat losses can be achieved by means of this. It is furthermore of advantage that the free design of the lines is made possible on account of the reduction of heat losses achieved by means of the material of the line sections.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION. OF THE DRAWINGS

The single FIGURE of the drawing is a schematic lateral view of a portion of a heat accumulator in accordance with the present invention, partially in section.

DESCRIPTION OF THE PREFERRED EMBODIMENTS

A portion of a heat accumulator 10, in particular a latent heat accumulator, is represented in the drawings, which has an accumulator core, not particularly identified, in its interior. The accumulator core constitutes the installation used for heat accumulation and is enclosed by an interior envelope 11, only schematically indicated. The interior envelope 11 is made of metal, preferably of aluminum, for example. At least one collecting reservoir 16 is part of the accumulator core and is either integrated into the accumulator core or is a separate element, fixedly connected with the accumulator core. The interior envelope 11 is enclosed at a distance by an exterior envelope 12. Because of the spacing, an insulating chamber 13 is formed between the interior envelope 11 and the exterior envelope 12, which can be evacuated and/or can contain a suitable insulating material, for example insulating powder.

The heat accumulator 10 furthermore has two lines 14 and 15, for example pipe lines, brought from the exterior through the insulating chamber 13. Of these lines, the one line is used as an inflow line and the other line as outflow line for a heat-conveying medium, for example the cooling water of an internal combustion engine.

The lines 14 and 15 terminate, for example at a facing front end, in the interior reservoir constituted by the interior envelope 11, in particular in the collecting reservoir 16, wherein the lines 14 and 15 are sealingly and fixedly connected with the interior envelope 11, in particular the collecting reservoir 16.

In conventional heat accumulators of a similar type, these lines 14 and 15 are universally made of aluminum. Because of the great heat conductivity, a lot of lost heat flows out of the accumulator core through such one-piece aluminum pipes to the exterior. Accordingly, the results are large heat losses. To reduce these, it has already been proposed to make the sections of the lines 14, 15, which extend through the insulating chamber 13, of plastic, since the heat-conducting capability of plastic is less than that of metallic lines. However, such a material is unsatisfactory. It is not sufficiently resistant to all temperature ranges through which the heat-conveying medium passes. Difficulties arise in particular with the fixed and sealed, particularly vacuum-tight, connection with the interior envelope 11 in the connecting area, for example with the collecting reservoir 16, as well as in those places where the line sections are brought out of the insulating chamber 13 and passed through the exterior envelope 12.

With the heat accumulator 10, each line 14, 15 has a line section 17 and 18 of a material with reduced heat-conducting capability, which in this case consists of an appropriate metal and preferably can be welded or soldered. It can be of particular advantage for the line sections 17, 18 to be made of special steel, for example of a rust- and acid-resistant chromium-nickel alloy steel. Pipe sections 17, 18 designed in this way have the advantage that because of the low heat-conducting capability of this metal it is possible to considerably reduce the heat losses. Furthermore, the manufacture of the heat accumulator 10 is possible in a simple and cost-effective manner.

It is particularly advantageous if, in the end section where the connection with the interior envelope 11, for example the collecting reservoir 16, is made, every line section 17, 18 is provided with a connecting sleeve 19 or 20 by means of which the line section 17 or 18 is fastened to the interior envelope 11, for example its collecting reservoir 16.

In the end area of the line sections 17, 18 leading out of the exterior envelope 12, each line section 17, 18 can also be advantageously provided with a connecting sleeve 21 or 22, by means of which the line section 21 or 22 is fastened on the exterior envelope 12. Each connecting sleeve 19 to 22 is made, for example, of aluminum. It is sealingly connected, preferably vacuum-tight, with the respective line section 17, 18, so that a secure separation in respect to the evacuated insulating chamber 13 is assured.

Furthermore, the respective connecting sleeve 19, 20 is also sealingly, preferably vacuum-tight, connected with the interior envelope 11, for example the collecting reservoir 16. The respective connecting sleeve 21, 22 is connected in the sane way sealingly, preferably vacuum-tight, with the exterior envelope 12. Efforts are made to form the interior envelope 12, in particular its collecting reservoir 16 to which the lines 14, 15 are connected, and/or the exterior envelope 12, from aluminum, wherein the entire heat accumulator 10 comprises a finished aluminum structure. In this connection it is then also advantageous that the connecting sleeves 19 to 22 are also made of aluminum. By means of this it is made possible to respectively connect the connecting sleeves 19, 20 with the interior envelope 11, and the connecting sleeves 21, 22 with the exterior envelope 12, by welding or soldering. This choice of material has advantages regarding weight and costs and also makes possible an aluminum/aluminum welded connection or soldered connection with the lines 14 and 15 in a simple manner.

The connecting sleeves 19 to 22 provided on the respective end area of the respective line sections 17, 18 can be made as separate sleeves, for example pipe sections, which are fastened on the respective line section 17, 18 by welding or soldering. A diffusion welding process, for example the explosion method, can be considered for the welded connection between the line sections 17 and 18, made of special steel, and the aluminum sleeves 19 to 22. In this way it is possible in a quick and simple manner to attach the connecting sleeves 19 to 22 on the area of both ends of a respectively pre-bent special steel pipe constituting the line section 17, 18 and to fasten them sealingly, in particular vacuum-tight.

In another exemplary embodiment, not shown, the respective line section 17, 18 can also be provided with the respective connecting sleeve 19 to 22 by the application of material, for example by flame-spraying with aluminum material.

Another alternative connection is provided by mechanical fastening of the respective connecting sleeve 19 to 22 on the line section 17, 18, wherein all possible mechanical connecting techniques are considered, for example a rolled-in connection.

In another advantageous exemplary embodiment the respective line 14, 15 is formed by a double-walled pipe section, for example an interior pipe of special steel which is covered on the outside by an aluminum jacket. In this case the aluminum jacket is removed, except for leaving connecting sleeves 19 to 22 at the respective end area. For example, this removal of the exterior aluminum jacket can be performed mechanically, for example by metal cutting.

It will be understood that each of the elements described above, or two or more together, may also find a useful application in other types of constructions differing from the types described above.

While the invention has been illustrated and described as embodied in a heat accumulator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A heat accumulator, comprising an interior envelope containing an accumulator core; an exterior envelope surrounding said interior envelope at a distance therefrom so as to form an insulating chamber; two lines extending through said insulating chamber and including an inflow line and an outflow line for a heat conveying medium, each of said lines having a line section extending in said insulating chamber, said line sections being formed of a metal having low heat conducting capability.

2. A heat accumulator as defined in claim 1, wherein said metal with a low heat conducting capability is a metal selected from the group consisting of welded metal and soldered metal.

3. A heat accumulator as defined in claim 1, wherein said metal with low heat conducting capability is a steel.

4. A heat accumulator as defined in claim 3, wherein said steel is a rust and acid resistant chromium-nickel alloy steel.

5. A heat accumulator as defined in claim 1, wherein a respective one of said line sections is connected with a respective one of said connecting sleeves by material application.

6. A heat accumulator as defined in claim 5, wherein a respective one of said line sections is connected with a respective one of said connecting sleeves by flame-spraying.

7. A heat accumulator as defined in claim 1, wherein a respective one of said lines is formed as a double-walled pipe section with an exterior aluminum jacket removed and with connecting sleeves arranged in end areas of said lines.

8. A heat accumulator as defined in claim 1, wherein said exterior envelope is composed of aluminum.

9. A heat accumulator, comprising an interior envelope containing an accumulator core; an exterior envelope surrounding said interior envelope at a distance therefrom so as to form an insulating chamber; two lines extending through said insulating chamber and including an inflow line and an outflow line for a heat conveying medium, each of said lines having a line section extending in said insulating chamber, said line sections being formed of a metal having low heat conducting capability, each of said line section being provided with a connecting sleeve in an end area adjoining said interior envelope so as to fasten a respective one of the line sections to said interior envelope, a respective one of said line sections being provided with a further connecting sleeve in an end area leading out of said exterior envelope so as to fasten a respective one of said line sections to said exterior envelope, each of said connecting sleeves being vacuum-tightly connected with respect to one of said line sections.

10. A heat accumulator as defined in claim 9, wherein said connecting sleeves are composed of aluminum.

11. A heat accumulator as defined in claim 9, wherein said connecting sleeves are composed of aluminum.

12. A heat accumulator as defined in claim 9, wherein each of said connecting sleeves is sealingly connected with respect to one of said line sections.

13. A heat accumulator as defined in claim 9, wherein each of said connecting sleeves is sealingly connected with said interior envelope.

14. A heat accumulator as defined in claim 13, wherein each of said connecting sleeves is vacuum-tightly connected with said interior envelope.

15. A heat accumulator as defined in claim 9, wherein each of said connecting sleeves is sealingly connected with said exterior envelope.

16. A heat accumulator as defined in claim 15, wherein each of said connecting sleeves is vacuum-tightly connected with said exterior envelope.

17. A heat accumulator as defined in claim 9, wherein each of said connecting sleeves is selected with at least one of said envelopes; and further comprising means for connecting said connecting sleeve to said respective one of said envelopes, said connecting means being means selected from the group consisting of welding means and soldering means.

18. A heat accumulator as defined in claim 9, wherein each of said connecting sleeves is fastened on a respective one of said line sections; and further comprising fastening means for fastening each of said connecting sleeve on said respective one said line sections, said fastening means being means selected from the group consisting of welding means and soldering means.

19. A heat accumulator as defined in claim 18, wherein said welding means is diffusion-welding connection means.

20. A heat accumulator as defined in claim 9, wherein a respective one of said connecting sleeves is mechanically fastened on a respective one of said line sections; and further comprising means for mechanically fastening a respective one of said connecting sleeves on said respective one of said line sections.

21. A heat accumulator as defined in claim 20, wherein said fastening means including rolling-in means.

22. A heat accumulator, comprising an interior envelope containing an accumulator core; an exterior envelope surrounding said interior envelope at a distance therefrom so as to form an insulating chamber; two lines extending through said insulating chamber and including an inflow line and an outflow line for a heat conveying medium, each of said lines having a line section extending in said insulating chamber, said line sections being formed of a metal having low heat conducting capability, each of said line section being provided with a connecting sleeve in an end area adjoining said interior envelope so as to fasten a respective one of the line sections to said interior envelope, a respective one of said line sections being provided with a further connecting sleeve in an end area leading out of said exterior envelope so as to fasten a respective one of said line sections to said exterior envelope, said interior envelope having a collecting reservoir to which said lines are connected and which is composed of aluminum, each of said connecting sleeves being vacuum-tightly connected with respect to one of said line sections.

* * * * *